United States Patent [19]

Markovic et al.

[11] Patent Number: 5,620,961
[45] Date of Patent: Apr. 15, 1997

[54] FRUCTOSE ESTER-β-CYCLODEXTRIN COMPLEXES AND PROCESSES FOR MAKING AND USING SAME

[76] Inventors: Nenad S. Markovic; Olivera T. Markovic, both of 259 Congressional La. Apt. 602, Rockville, Md. 20852

[21] Appl. No.: 328,310

[22] Filed: Oct. 24, 1994

Related U.S. Application Data

[63] Continuation of Ser. No. 233,113, Apr. 25, 1994, abandoned.

[51] Int. Cl.$^6$ ............................. A61K 31/72; C07H 15/06
[52] U.S. Cl. .................... 514/23; 514/25; 514/58; 514/917; 514/922; 514/974; 536/4.1; 536/18.2; 536/103; 536/119
[58] Field of Search ................................ 514/23, 58, 25, 514/917, 922, 974; 536/6.4, 103, 115, 4.1, 18.2, 119

[56] References Cited

U.S. PATENT DOCUMENTS

| | | | |
|---|---|---|---|
| 4,546,095 | 10/1985 | Markov | 514/23 |
| 5,124,318 | 6/1992 | Gatti et al. | 514/34 |

*Primary Examiner*—James O. Wilson
*Attorney, Agent, or Firm*—Duane, Morris & Heckscher

[57] ABSTRACT

A specialized derivative of fructose in which the compound is a fructose ester complexed with β-cyclodextrin. Preferably, the fructose derivative is fructosehexanoate β-cyclodextrin complex, and more preferably the fructose derivative is fructose-1-O-hexanoate β-cyclodextrin complex. Fructose pentanoate and fructose heptanoate β-cyclodextrin complexes are also included within the scope of the invention, and the fructose ester and the β-cyclodextrin must be combined in approximately molar equivalent amounts. The present invention also includes a method for treating animals and humans with the instant fructose derivatives, to protect against tissue damage caused by doxorubicin cytotoxicity (particularly doxorubicin-induced cardiomyopathy or mucositis), ischemia, radiation damage and other sources of free oxygen radical cellular damage to the tissue of living animals and humans. The present fructose derivative is an active agent which is appropriately incorporated in a pharmaceutical dosage form which may be but need not be an aqueous solution, and the pharmaceutical composition may be given in a wide range of doses to address either acute or chronic needs.

23 Claims, No Drawings

FRUCTOSE ESTER-β-CYCLODEXTRIN COMPLEXES AND PROCESSES FOR MAKING AND USING SAME

RELATED APPLICATIONS

This is a continuation of U.S. application Ser. No. 08/233,113, entitled "TISSUE INJURY PROTECTIVE ACTIVE AGENT", filed Apr. 25, 1994, now abandoned.

FIELD OF THE INVENTION

The present invention relates to protecting living tissue from biochemical injury-such as the injury caused by anticancer chemotherapeutic agents, radiation or ischemia.

BACKGROUND OF THE INVENTION

I. Tissue injury incident to chemotherapeutic agents.

Anthracycline antibiotics, one of which is the well-known chemotherapeutic agent doxorubicin, is a class of drugs widely used in anticancer chemotherapy with particular efficacy against lymphoma, leukemia, myeloma, breast cancer, and small cell lung carcinoma. Although the potential of these drugs to kill cancer cells in vitro has been almost unlimited, the in vivo applications have been somewhat limited due to the agents' severe side effects. The severity of the side effects has been observed in patients who were accidentally exposed to high single or total (cumulative) doses, or in laboratory animals.

If a patient receives an accidentally high dose of doxorubicin, i.e., above 100 mg/m$^2$, he may die in a few hours because of cardiac arrhythmia, or in a few days due to severe necrotizing general mucositis. A survivor may expect irreversible aplastic anemia within a few weeks, or chronic heart failure after a few months. Conventional therapeutic protocols allow individual doses of 40–60 mg/m$^2$ in repeated doses until 550 mg/m$^2$ total dose is reached, usually within 6–12 months. Accumulation of doxorubicin total dose beyond this safe range increases the risk for development of chronic irreversible heart failure.

Doxorubicin affects several targets inside heart myocytes and the result is visible as swelling and decomposition of myofibriles, vacuolization and granulation inside cytoplasm, interstitial edema, activation of fibroblasts, necrosis of myocytes and their restitution with fibrotic tissue. Six weeks after damage, the scar tissue appears, and this is of course incompatible with heart muscle function and signs of cardiac failure become progressively more pronounced. In some cases, irreversible cardiac damage can appear five years after successful cancer treatment.

Theoretically, heart damaged patients whose cancer is in remission have the escape option of heart or heart/lung transplantation. These transplantation options have recently been recognized as an important available method to treat doxorubicin-induced irreversible cardiomyopathy in children (Luthy, A., et al., "Orthotopic heart transplantation: an efficient treatment in a young boy with doxorubicin-induced cardiomyopathy," *J. Heart and Lung Transplantation*, 11:815–816 (1992)). As a practical matter, however, the cumulative toxicity of doxorubicin has meant that it has not been administered in high enough amounts to achieve the dramatic cancer remissions of which it would otherwise be capable.

Enormous efforts have been devoted to find a way to prevent, to postpone or to cure doxorubicin cardiotoxicity, and about one hundred drugs have been proposed to date for this purpose. However, either because of their own side effects or because of their action to reduce doxorubicin's antiproliferative effect, only a few have reached clinical trials and none has been accredited as the final solution to the problem.

Doxorubicin is believed to act primarily against DNA, but also generates free oxygen radicals in both normal and cancerous cytoplasm and antimetabolic action inside mitochondria. Suppression of oxygen free radical damage of cells can prevent, alleviate or reverse other diseases as well.

II. Tissue injury incident to free oxygen radicals.

Free oxygen radicals cause cell damage primarily due to lipid peroxidation and other degenerative intracellular biochemistries. Free oxygen radicals thus figure in the etiology of many tissue-injury type diseases, including but not limited to the ischemic diseases-myocardial infarction, stroke, and thrombosis—as well as hypoxia, hyperthermia, the various radiation injuries and certain obesity etiologies. Although different investigators have endeavored to find a protective agent for these types of cell damage, apart from the efforts to overcome doxorubicin carcliotoxicity and other side effects, these efforts have heretofore been disappointing at best.

Accordingly, a need remains for an active agent which can protect cells from tissue injury caused by chemotherapeutic agents, ischemia and radiation. More importantly, a need remains for an active agent which can protect normal cells from injury while at the same time permitting an anticancer agent such as doxorubicin to exert its potent, antiproliferative effect on the tumor cells.

SUMMARY OF THE INVENTION

In order to meet this need, the present invention is a specialized derivative of fructose in which the compound is a fructose ester complexed with β-cyclodextrin. Preferably, the fructose derivative is fructosehexanoate β-cyclodextrin complex, and more preferably the fructose derivative is fructose-1-O-hexanoate β-cyclodextrin complex. Fructose pentanoate and fructose heptanoate β-cyclodextrin complexes are also included within the scope of the invention, and the fructose ester and the β-cyclodextrin must be combined in approximately molar equivalent amounts. The present invention also includes a method for treating animals and humans with the instant fructose derivatives, to protect against tissue damage caused by doxorubicin cytotoxicity (particularly doxorubicin-induced cardiomyopathy or mucositis), ischemia, radiation damage and other sources of free oxygen radical cellular damage to the tissue of living animals and humans. The present fructose derivative is an active agent which is appropriately incorporated in a pharmaceutical dosage form which may be but need not be an aqueous solution, and the pharmaceutical composition may be given in a wide range of doses to address either acute or chronic needs.

DETAILED DESCRIPTION OF THE INVENTION

The present invention is a specialized derivative of fructose in which the fructose derivative is a fructose ester complexed with β-cyclodextrin. Preferably, the fructose derivative is fructosehexanoate β-cyclodextrin complex, and more preferably the composition is fructose-1-O-hexanoate β-cyclodextrin complex. The invention includes the administration of one or more of these fructose derivatives, by a variety of routes, to an animal or human in which particular tissue injury is sought to be prevented or alleviated. Various significant indications for the administration of these specialized fructose derivatives include the administration of doxorubicin or other anthracycline chemotherapeutic treatment of various cancers, or risk or onset of diseases including but not limited to myocardial infarction, stroke, thrombosis and radiation injuries.

A description of the present active agent and treatment method is more illustrative if it first addresses simpler fructose derivatives that are not disclosed and claimed as a pan of the present invention. Fructose-1,6-diphosphate has been shown to exert a protective effect against cardiomyopathy during doxorubicin administration, see Bernardini, N., et al., "Fructose-1,6-diphosphate reduces acute EKG changes due to doxorubicin in isolated rat heart," *Experientia*, 44:1000–1002 (1988). On the basis of these studies, we designed a series of in vitro experiments to study the effects of fructose and naturally occurring phosphate derivatives (fructose-1-phosphate, fructose-6-phosphate, fructose-1,6-diphosphate) on heart and tumor cells exposed to doxorubicin. We used K562. YAC-1, NB41A3 and H9c2 cell lines well known in the art. In this study, we confirmed that fructose and phosphate derivatives, at concentrations between 10 and 100 mg/ml, oppose doxorubicin cytotoxicity effects while sparing the antiproliferative effect. In other words, the fructose phosphates allowed the doxorubicin to stop tumor proliferation without killing the tissue being treated.

Incidentally, prior to the investigation of the ability of fructose phosphates to oppose doxorubicin cytotoxicity, fructose phosphates had been documented in the literature as protective of cardiac tissue. Markov, A. K., et al., "Hemodynamic, electrocardiographic and metabolic effect of fructose diphosphates on acute myocardial ischemia," *Amer. Heart J.*, 100:639–646 (1989), demonstrated that fructose diphosphate causes regression of EKG ischemic changes and prevented arrythmias in myocardial infarctions. Fructose disphosphate was also shown by Marchionni. N., et al, "Improved exercise tolerance by i.v. FDP in chronic stable angina pectoris," *J. Clin. Pharm.*, 28:807–811 (1988) (see also Marchionni et al. "Hemodynamic and electrocardiographic effects of FDP in acute myocardial infarction," *Am. J. Cardiol.*, 56:266–269 (1985)), to delay ST segment depression, to improve exercise tolerance in stable angina pectoris and to have protective effect in myocardial infarction in men. See also Danesi, R., et al. "Protective effects of fructose-1,6-diphosphate on acute and chronic doxorubicin toxicity in rats," *Cancer Chemother. Pharmacol.*, 25:325–332 (1990). The mechanism of protective effect of FDP is based on the restoration of the depressed glycolytic activity of the ischemic myocardium, according to Markov et al., supra, and in "Increasing survival of dogs subjected to haemorrhagic shock by administration of fructose-1,6-diphosphate." *Surgery*, 102:515–527 (1987), and the apparent consequent increase of intracellular ATP. FDP also apparently acts directly as an oxygen radical scavenger—inasmuch as, for example, it has exhibited a protective effect against paracetamol-induced liver injury (Maurelle. M., et al., "Prevention of paracetamol induced injury by fructose." *Biochem. Pharm.*, 41:1831–1837 (1991)).

Apart from all of the above, however, it is important to recognize that these prior an fructose phosphates, in order to achieve effective concentrations of a fructose phosphate on a cellular level in humans, would need to exceed the normal glucose level in serum concentration. It is not likely that such a "sugar stress" could be tolerated by human metabolism, and toxic side effects would be expected in any event.

Surprisingly, we have been able to develop specialized fructose derivatives which can achieve the same effect as the fructose phosphates—antiproliferation without cytotoxicity—at concentrations 1000 times lower than fructose phosphate compounds. These derivatives are fructose esters complexed with β-cyclodextrin. More particularly, our fructose derivatives are preferably fructosehexanoate β-cyclodextrin complex and, more preferably, fructose-1-O-hexanoate β-cyclodextrin complex.

Fructosehexanoate β-cyclodextrin complex is a new synthetic composition produced by an inorganic catalyst controlled esterification, to prepare fructosehexanoate esters, followed by dissolution of the ester(s) into an aqueous solution of β-cyclodextrin. (In this context, the water may be regarded as a pharmaceutically acceptable excipient.) The concentrations of the fructosehexanoate ester and the β-cyclodextrin in the aqueous solution are not critical, and they should be in approximately 1:1 molar ratio. Each molecule of β-cyclodextrin, due to its chemical structure in solution, partially encapsulates the esterified end of the fructosehexanoate molecule to prepare the inventive complex in solution. Because β-cyclodextrin has such a large molecular weight, a mixture of 0.45 mg/ml fructosehexanoate with 0.75 mg/ml β-cyclodextrin distilled water is one example of a roughly 1:1 molar admixture 11:1.4 by weight) of fructosehexanoate and β-cyclodextrin.

Although greater detail is given below, it is important to appreciate that we have not merely solubilized fructosehexanoate by admixing it with β-cyclodextrin. We have determined experimentally that β-cyclodextrin alone, as well as fructose alone and hexanoic acid alone, each exerts a tissue-protective effect in the manner of, but not anywhere close to the degree of, the present invention. We identified for the first time that a complex including fructosehexanoate and β-cyclodextrin demonstrates much more than the additive effects of the three constituents taken alone. Thus, the present active agent gives truly synergistic pharmaceutical activity, and the specific selection of β-cyclodextrin as the complexing constituent forms an important part of the invention. After all, many other compounds and compositions could have been used merely to combine with and to solubilize water insoluble fructose esters, and it was in part due to the use of β-cycloclextrin that we were able to achieve the desired effect at 1000 times lower concentrations than fructose phosphate compounds.

The most preferred embodiment of the present fructose ester is fructose-1-O-hexanoate β-cycloctextrin complex. Fructose-1-O-hexanoate may be synthesized by, for example, the enzymatic synthesis taught by Carrea et al., "Enzymatic synthesis of various 1-O-sucrose and 1-O-fructose esters," *J. Chim. Soc. Perkin Trans*, 1:1-57–1061 (1989). By this synthesis, activation of hexanoic acid is achieved with 2,2,2 trichlorethanol, and the resulting trichlorethylhexanoate and fructose are treated with protease-N in dry DMF for transesterification reaction to yield 1-O-hexanoylfructose. Other ortho esters of fructose and their syntheses are also disclosed by Carrea et al. After purification, this ester is a yellowish oily substance which is insoluble in water, but which becomes solubilized in aqueous β-cyclodextrin. Working solutions need not be as dilute as the 0.45 mg/ml fructosehexanoate with 0.75 mg/ml β-cyclodextrin aqueous solutions described above, and thus solutions containing 1 mg/ml and 1.4 mg/ml respectively, or even 10 mg/ml and 14 mg/ml, respectively, have utility in the context of the present invention.

It should be noted that the present fructose hexanoate β-cyclodextrin complex is a mixture in which the esterification does not appear in the 1-O-position in every ester molecule. The results obtained with the specific fructose-1-O-hexanoate β-cyclodextrin complex have been even better than with the mixed esters, which is why the latter complexes are most preferred. However, it should also be noted that we have also achieved good results with pentanoyl and heptanoyl fructose esters complexed with β-cyclodextrin. The fatty acid moiety of the ester should not, however have 4 or fewer or 8 or more carbon atoms.

An important part of the present invention is not only the identification of these new pharmaceutically active fructose derivatives but their administration to animals or humans in which the tissue injury protection discussed above is needed. One useful route of administration is intravenous administration, in order to bring the present fructose derivatives to the tissue site where their tissue protective action is needed. However, the present fructose derivatives are difficult to hydrolyze or to dissociate and thus may be given by a wide variety of other routes, including oral, peroral, transmucosal (buccal, sublingual, etc.) and transdermal. Moreover, a wide range of dosages has utility regarding the present fructose derivatives, and doses of between 1–100 mg/day (for a medium male, 6 ft. tall, 180 lbs.) have already been shown to be safe and effective. A typical protective (prophylactic) dose would be 20 mg per day. It must be remembered, however, that in circumstances of acute need, such as extensive acute myocardial infarction, much higher doses will be necessary and as such may be given by targeted means such as by cardiac catheterization, or at least intraarterially. Dosages of up to 1–2 g. per day are thus within the larger range contemplated, according to the present invention.

Although certainly the esterification and β-cyclodextrin complexing of fructose enhances the cellular availability of fructose over fructose taken alone, or fructose phosphate(s), it bears repeating that we have identified an activity with the present fructose derivatives which exceeds the activity of fructose or fructose phosphate(s) by 1000 times. Simply improving cellular availability or standard cell membrane transport of an active agent cannot account for this 1000-times greater pharmaceutical activity, and the results attained have been more than unexpected—they have been astonishing.

Not insignificantly, the components of the two preferred fructose derivatives according to our invention are also the common constituents of such natural sources as honey (fructose), bread (β-cyclodextrin) and butter (hexanoic acid). Although details and data concerning both our surprisingly beneficial pharmaceutical results and the low toxicity of our fructose derivatives appear in the following examples, which are illustrative only and not intended to be exhaustive, the presence of the reactive constituents of the present invention in such common food sources evidences at least in pan the safe and nontoxic nature of this new family of drugs.

EXAMPLE 1

A. Test Protocols

In vitro studies were conducted in five phases. First, we established reference values for doxorubicin as a toxic drug in an acute toxicity assay (ATA and IATA) and in an acute toxicity, and recovery assay (ATARA). These assays are described below. Next, we demonstrated the inhibitory effect of FDP against doxorubicin-induced cytotoxicity in ATA-(IATA) and ATARA. Subsequently, we compared fructose with its mono- and di-phosphates. Fourth, we demonstrated the efficacy of fructosehexanoate β-cyclodextrin complex and fructose-1-O-hexanoate β-cyclodextrin complex in ATA and ATARA studies, using fructose diphosphate as a control. Fifth, we compared the effect of fructose diphosphate with N-acetylcysteine, α-tocopherol, and ICRF-187 as controls. N-acetylcysteine and α-tocopherol are two known free-oxygen-radical scavenger drugs which have been used against doxorubicin-induced cardiomyopathy.

The various assays we used are standard and well within the ability of those skilled in the art. However, the following comments will clarify the results which follow.

The Acute Toxicity Assay (ATA) has been designed to test the effect of increasing concentrations of a new drug to an established cell line under standard conditions. We specifically use published tests: the Dye Exclusion Test (DET); the $^{51}$Cr Release Assay and the LDH Release Assay. Working with a new drug, we prepare a series of solutions with concentrations increasing in a log scale, below and beyond a concentration that is estimated as within the therapeutic range in the blood. We apply 0.1 ml of these solutions to 0.9 ml of cell suspension containing approximately $2.5 \times 10^5$ cells/ml. After 60 minutes' incubation at 37° C. we measure in DET variant a total number of cells (Cell Density, CD), viable cells, and calculate Viability Index (VII and Cytotoxicity Index (CI) for each concentration. Viability Index (VI) is the percentage of viable cells in a sample: the Cytotoxicity Index (CI) is calculated according to the formula:

$$CI = 100 \, (1 - VI_{cell \, suspension \, with \, drug}/VI_{control \, cell \, suspension \, without \, drug})$$

The concentration of drug below which no cell damage is measured (CI<1) was indicated as the threshold of sensitivity, whereas the concentration of drug beyond which all cells were killed (CI>99) is the threshold of toxicity. The range of concentration between these two thresholds is the range in which cell kill is based upon drug concentration. Then, 5–10 concentrations increasing in linear scale are prepared, between the two thresholds. The drug concentration at which 50% cytotoxicity is measured is the $LC_{50}$ (mean lethal concentration) for that particular drug.

The Inhibition of Drug-Induced Acute Cytotoxicity Assay (IATA) is based on the ATA as a model. After establishing an $LC_{50}$ for a given drug, we prepare solutions of the inhibitor subject to testing, in a series of log concentrations below and beyond an estimated effective dose. By following the general protocol of the ATA we identify the IC, or the concentration in mg/ml of drug-inhibitor in a cell suspension together with $LC_{50}$ of toxic drug, that is able to reduce the cytotoxicity of the toxic drug by 50%.

The Acute Toxicity and Recovery Assessment (ATARA) has been developed to allow study of doxorubicin-induced cytotoxicity in vitro as a result of two effects: the cytocidal effect of doxorubicin, in contrast with its antiproliferative (cytostatic) effect. The assay is a serial assessment of cell viability after a short (60 min, 37° C., pH 7.0–7.2) exposure to drugs, followed by washing the extracellular excess of drugs, adding a growth medium, continuing incubation and assessing the cell recovery each consecutive day for three days. Chemiluminescence of doxorubicin is a useful tool for obtaining information of drug distribution within cells at different intervals of this test. Cytocidal effect can be expressed as VI, CI and the Inhibition Index, or IN=100 x (1-$CI_{test}/C_{control}$). Cytostatic (antiproliferative) effect can be expressed in terms of CD (cell density) and VI, and also the Population Doubling Level (PDL), or the total number of population doublings of a cell line or strain since initiation of its growth in vitro.

The Lactic Dehydrogenase (LDH) Release Assay measures the number of cells damaged by $LC_{50}$ —doxorubicin in this case—both in ATA and ATARA assays. The cultured cell suspension with known cell density was spun at 3,000 rpm for 10 minutes, and the supernatant culture medium was used for analysis. 2 mg NADH were dissolved in phosphate buffer (0.1 M pH 7.5). 0.2 ml of this fleshly prepared solution were added to 0.6 ml phosphate buffer and 0.1 ml medium. The mixture was incubated 20 minutes at room temperature. After the incubation 0.1 ml sodium pyruvate (22.7 mM, pH 7.5) was added and the entire content was immediately transferred into 1 cm light path quartz cuvette. Change of optical density was determined per minute at 340 nm with a spectrophotometer (Bausch and Lomb Spectronic 2000). The change of optical density for 0.001 at 340 nm in the mixture described was used as an arbitrary unit and was expressed per $10^4$ cells.

Doxorubicin has primary fluorescence (chemiluminescence) that can be seen in blue epifluorescent light, with dark field, as yellow-orange colored light coming from granules concentrated inside nuclei and mitochondria, or scattered through cytoplasm. Cell morphology was simultaneously determined in transmitted light available in parallel in an Olympus fluorescent microscope.

The glutathione assay was conducted as follows. After completion of ATA, IATA, and/or ATARA assays, cells were cyto-spun onto microscope slides. Cells were immediately fixed in a mixture of acetone and water (9:1) for 30 seconds, and incubated in 50 μM Mercury Orange dissolved in acetone-water (9:1) for 3 minutes. The cell preparation was then rinsed in acetone-water for 2 minutes, and in distilled water for 1 minute to remove any excess of Mercury Orange. Preparations were examined under fluorescent blue light. Cell morphology was simultaneously assessed in transmitted light available at the microscope. GSH was visualized as a granular deposit with yellow-orange fluorescence, scattered inside cytoplasm.

B. Results

Using the above-described tests, we demonstrated two aspects of doxorubicin cytotoxicity separately. In ATA we measured the cell kill effect (cytoplasmic damage) and in ATARA we measured antiproliferative effect (cessation of cell growth and proliferation). As shown in Table 1. below. doxorubicin decreases cell viability in a concentration dependent manner, and decreases cell density up to 5%.

TABLE 1

ATA/k562: $LC_{50}$ for doxorubicin cytotoxicity against K-562 cell line

| Drug | concentration mg/ml | CD x $10^4$ | VI % | CI mean | +/− | SD |
|---|---|---|---|---|---|---|
| CTRL | 0.0 | 25 | 100 | — | | |
| DOX | 0.2 | 24 | 86 | 13 | +/− | 3 |
| DOX | 0.4 | 25 | 64 | 36 | +/− | 2 |
| DOX | 0.6 | 24 | 35 | 65 | +/− | 8 |
| DOX | 0.8 | 23 | 16 | 84 | +/− | 8 |
| DOX | 1.0 | 24 | 1 | 98 | +/− | 2 |

CD = Cell Density
VI = Viability Index
CI = Cytotoxicity Index

When these effects were plotted as cytotoxicity index against drug concentration, the drug dose-effect relation curve enabled determination of $LC_{50}$ for doxorubicin: 50.5 mg/ml for K562 cell line in suspension of $25 \times 10^4$ cells/ml, after incubation of min. at 37° C., pH 7.0–7.2.

We then evaluated the cytostatic effect of doxorubicin as follows. Using the ATARA test described above, we demonstrated that doxorubicin administration to K562 cells at $LC_{50}$ actively suspends cell growth, and ceases cell proliferation. We also showed that the cytotoxicity of doxorubicin, when applied in concentrations below $LC_{50}$, depends upon drug concentration during exposure and time passed after exposure. These findings were not surprising in view of previously published reports In order to enable comparison with the above-described cytotoxicity and cytostatic effects, we repeated the assays but added fructose diphosphate. We identified that fructose diphosphate added in concentrations of 10–100 mg/ml to the cell culture opposed doxorubicin-induced cytotoxicity and demonstrated the inhibition index from 20–90% (plots as a bell-shaped curve increasing VI at lower concentration and decreasing at higher). $IC_{50}$ or the concentration at which fructose diphosphate reduced reduction of $LC_{50}$ doxorubicin cytotoxicity was determined to be 36 mg/ml.

We also showed that fructose diphosphate does not oppose the antiproliferative effect of doxorubicin, even though it does oppose cytotoxicity, as follows. After incubating cells in vitro for 60 minutes in doxorubicin and fructose diphosphate, the cells were washed 3 times with 3 ml serum free medium to remove all trace of either. The cells were then permitted to remain in growth medium containing serum and no drugs. Fluorescence control was used to identify doxorubicin distribution inside cell cytoplasm and nuclei. After one hour of exposure to a high dose of doxorubicin (0.5 mg/ml doxorubicin for population of K562 cells with low density is a high dose) only less than half of the cells survived. However, this effect was effectively counteracted by 40 mg/ml fructose diphosphate, yielding 86% of cells alive. No viable cell population was found after 24, 48 and 72 hours in samples containing doxorubicin, or doxorubicin/fructose diphosphate, while in the control sample cell density increased by three times (unaltered, viable cells proliferate freely). This test indicated that fructose diphosphate was not able to suppress doxorubicin antiproliferative activity, even though it had separately been shown to oppose doxorubicin's direct cytotoxic effect (despite the fact that this cytotoxicity opposition was incomplete).

Although we compared the effects of fructose diphosphate with N-acetylcystein, α-tocopherol and ICRF 187 as controls, the results are omitted here because they are not illustrative of the present invention. However, all of these active agents opposed doxorubicin cytotoxicity in an apparently dose dependent manner.

In order to enable further comparison with the cytotoxicity and cytostatic effects of doxorubicin both with and without addition of the present fructose derivatives, we separately added fructose hexanoate β-cyclodextrin complex and fructose-1-O-hexanoate β-cyclodextrin complex during execution of the IATA assay discussed above. We established that fructose-hexanoate β-cyclodextrin complex opposed doxorubicin cytotoxicity in a concentration dependent manner, when administered between $25 \times 10^{-4}$ and $25 \times 10^{-3}$ mg/ml. We further established that the $IC_{50}$ for fructose hexanoate β-cyclodextrin complex is 50 μg/ml. This is, obviously, a very low concentration. We also established via ATARA that fructose hexanoate β-cyclodextrin complex did not interfere with the antiproliferative effect of doxorubicin as measured by the population doubling level. This non-antiproliferative effect was equivalent to that reported for fructose diphosphate, and exemplary results appear in the following Table 2.

TABLE 2

ATARA/K562: FHCD and FDP do not oppose
doxorubicin antiproliferative effect in
ATARA as measured by population doubling level*

| TIME hrs | DRUG | VI % | CI % | IN % | PDL tnc | PDL VI |
|---|---|---|---|---|---|---|
| 01 | CTRL | 95 | — | — | 0 | 0 |
|    | DOX | 48 | 49 | — | 0 | 0 |
|    | DOX/FDP | 68 | 28 | 43 | 0 | 0 |
|    | DOX/ICM** | 72 | 24 | 51 | 0 | 0 |
| 24 | CTRL | 95 | — | — | 0.24 | −0.21 |
|    | DOX | 0 | 100 | — | −1.14 | −0.95 |
|    | DOX/FDP | 0 | 100 | 0 | −1.00 | −1.09 |
|    | DOX/ICM | 0 | 100 | 0 | −1.29 | −1.34 |
| 48 | CTRL | 95 | — | — | 1.16 | −0.15 |
|    | DOX | 0 | 100 | — | −1.88 | 0 |
|    | DOX/FDP | 0 | 100 | 0 | −2.14 | −3.35 |
|    | DOX/ICM | 0 | 100 | 0 | −1.66 | −3.57 |
| 72 | CTRL | 95 | — | — | 2.67 | −0.12 |
|    | DOX | 0 | 100 | — | −1.14 | 0 |
|    | DOX/FDP | 0 | 100 | 0 | −2.14 | 0 |
|    | DOX/ICM | 0 | 100 | 0 | −1.00 | 0 |

*a formula to use for the calculation of PDL in a single passage is: PDL (number of population doubling) = $\log_{10}(N/N_o)$ vessel at the end of a period of growth, where N is the number of cells in the growth vessel at the end of a period of growth and where $N_o$ = number of cells plated in the growth vessel.
LEGEND: FDP is fructose-1,6-diphosphate 40 mg/ml; **ICM is FHCD, or fructose hexanoate β-cyclodextrin. DOX is doxorubicin; VI is cell viability index; and tnc is total number of cells.

Apart from the data presented above, additional data are available to substantiate that the 1-O ester (fructose-1-O-hexanoate β-cyclodextrin) has an $IC_{50}$ of 0.1 mg/ml, for an incubation mixture containing $25 \times 10^4$ K562 cells/ml and doxorubicin 0.5 mg/ml, with an incubation time of 60 minutes at a temperature of 37° C. and pH of 7.0–7.2. The 1-O ester opposed doxorubicin cytotoxicity at double concentration of cells. In summary, we have demonstrated that the 1-O ester is effective against doxorubicin-induced cytotoxicity, and the effect is dependent upon cell concentration, time of exposure, preincubation and doxorubicin concentration. We have also established by the same protocols as described above that the 1-O ester does not oppose doxorubicin-induced antiproliferative effect in ATARA. At low cell density, $(15 \times 10^4)$, 0.5 mg/ml doxorubicin was an effective killer (CI=63%) after 60 minutes of exposure. However, this effect was successfully counteracted with 0.1 mg/ml fructose-1-O-hexanoate β-cyclodextrin (IN=41%). After washing the drugs from the cells in the medium, the cells were left to incubate under normal conditions. After 24 hours the control cell population increased by 13%, while populations with doxorubicin and doxorubicin plus fructose-1-O-hexanoate β-cyclodextrin complex decreased in density by three times. Even in this situation the 1-O ester demonstrated an anti-doxorubicin effect, and preserved viability in one-third of residual cells.

EXAMPLE 2

In vivo studies were also conducted in support of the present fructose derivatives and their pharmaceutical utilities.

Forty Wistar rats in ten groups of 4 each were dosed with varying amounts of fructose hexanoate β-cyclodextrin complex, including 16 control rats who received no fructose derivative complex. Animal behavior was observed for 40 days, although half of each group was sacrificed on day 8. After sacrifice of all animals either on day 8 or day 40, biopsy material was evaluated histologically.

Despite histological evaluation performed by paraffin embedding and hematoxylin/eosin staining on various organs of the rats, no histopathologic signs related to fructose hexanoate β-cyclodextrin complex were identified. Certain pathohistologic changes such as vacuole degeneration of tubular cells in kidneys, and scattered infiltrates with small cells in lung and liver, were seen in the control rats as well as the test rats and thus were not attributable to the administration of fructose hexanoate β-cyclodextrin. A similar chronic toxicity study (in progress at this writing) has not to date identified any toxicity from the administration of fructose hexanoate β-cyclodextrin complex to Wistar rats.

The present fructose derivatives were then given to rats, in appropriately controlled studies, in conjunction with doxorubicin. Twenty (64%) out of 31 animals received doxorubicin without (25%) or with (75%) protection with fructose-hexanoate β-cyclodextrin complex (9/15) or fructose diphosphate (6/15). Nineteen of them (95%) developed severe diarrhea beginning the third day after application of doxorubicin. One (5%) developed symptoms six days after doxorubicin—this rat received fructose-hexanoate β-cyclodextrin complex as a single pretreatment dose. Eight of them (42%) died approximately three days after the onset of symptoms. Only one (5%) has been recovered. This rat was treated by fructose-hexanoate β-cyclodextrin complex protection (three applications). Two other rats in the same group, as well as this one, developed signs of diarrhea beginning the fourth day after doxorubicin initiation—one say later than average. Gross anatomy evaluation was in congruence with severe mucositis for all animals that received doxorubicin. Only the three rats which received the fructose-hexanoate β-cyclodextrin or fructose diphosphate were seen to have had lower degrees of gastrointestinal inflammation than the other rats. Fructose-hexanoate β-cyclodextrin complex administration lessened initial cardiomyopathy in 33% of the rats, and fructose diphosphate lessened initial cardiomyopathy in 17% of the rats. Better results were obtained when fructose hexanoate β-cyclodextrin complex was administered more than once, prior to the onset of doxorubicin therapy.

Although the invention has been described with particularity above, both in the description and the foregoing examples, these passages are illustrative only and the invention is only to be limited insofar as is set forth in the accompanying claims.

We claim:

1. A pharmaceutical composition comprising a synergistic combination of complexed active agents in an amount effective to inhibit cytotoxicity induced by doxorubicin, ischemia, chemotherapeutically-induced cardiomyopathy or radiation injury in a manunal, wherein said active agents are fructose hexanoate admixed with an approximately molar equivalent quantity of β-cyclodextrin and a pharmaceutically acceptable excipient.

2. The pharmaceutical composition according to claim 1 wherein said fructose ester is fructose hexanoate.

3. The pharmaceutical composition according to claim 1 wherein said fructose ester is fructose-1-O-hexanoate.

4. The pharmaceutical composition according to claim 1 wherein said fructose ester and said β-cyclodextrin form a complex wherein said ester is at least partially encapsulated by said β-cyclodextrin.

5. The pharmaceutical composition according to claim 1 wherein the composition is an aqueous solution suitable for intravenous administration to an animal or patient.

6. The pharmaceutical composition according to claim 1 wherein the composition is an aqueous solution suitable for intraarterial administration to an animal or patient.

7. The pharmaceutical composition according to claim 1 wherein said active agent is incorporated into a dosage form for administration to an animal or patient by a route selected from the group consisting of buccal, sublingual, oral, peroral or transdermal.

8. A pharmaceutical composition comprising a synergistic combination of complexed active agents having antioxidant activity in an amount to inhibit cytotoxicity induced by doxorubicin, ischemia, chemotherapeutically induced cardiomyopathy or radiation injury in a mammal, wherein said active agents are selected from the group consisting of fructose pentanoate or fructose heptanoate admixed with an approximately molar equivalent quantity of β-cyclodextrin and a pharmaceutically acceptable excipient.

9. A method for treating tissue injury in a mammal comprising administering to a mammal in need of such treatment one or more unit doses of a pharmaceutical composition comprising a synergistic combination of complexed active agents, wherein said agents are fructose hexanoate admixed with an approximately molar equivalent quantity of β-cyclodextrin and a pharmaceutically acceptable excipient.

10. The method according to claim 9 wherein said method further comprises administering said active agent by a route selected from the group consisting of intravenous, intraanerial, buccal, sublingual, oral, peroral or transdermal.

11. The method according to claim 9 wherein said active agent is administered to a human patient at a dose between 1–1000 mg per day.

12. The method according to claim 11 wherein said active agent is administered to an approximately 6 foot, 180 pound human male patient at a single dose between 1–100 mg m$^2$ per day in single or multiple applications.

13. The method according to claim 11 wherein said active agent is administered at a dose of up to about 20 g. per day for daily use in long term chronic therapy.

14. A method for treating doxorubicin cytotoxicity in a mammal comprising administering to a mammal in need thereof an effective anti-doxorubicin cytotoxicity amount of a synergistic combination of complexed active agents, wherein said agents are fructose hexanoate admixed with an approximate molar equivalent quantity of β-cyclodextrin and a pharmaceutically acceptable excipient, wherein said effective amount does not affect the doxorubicin anti-proliferative effect.

15. The method according to claim 14 wherein said method further comprises administering said active agent by a route selected from the group consisting of intravenous, intraarterial, buccal, sublingual, oral, peroral or transdermal.

16. The method according to claim 14 wherein said active agent is administered to a human patient at a dose between 1–1000 mg per day.

17. The method according to claim 16 wherein said active agent is administered to an approximately 6 foot, 180 pound human male patient at a dose between 1–100 mg per day in multiple applications.

18. The method according to claim 14 wherein said active agent is administered at a dose of about 20 g. per day for daily use in chronic therapy.

19. A method for treating an animal or patient in which protection from ischemia, chemotherapeutically-induced cardiomyopathy or radiation injury is desired, comprising administering to said animal or human in need thereof one or more unit doses of a pharmaceutical composition comprising an active agent comprising a synergistic combination of a fructose ester selected from the group consisting of fructose hexanoate, fructose pentanoate. fructose hexanoate and fructose heptanoate in admixture with an approximately molar equivalent quantity of β-cyclodextrin, together with at least one pharmaceutically acceptable excipient, in an amount effective to treat said ischemia, chemotherapeutically-induced cardiomyopathy or radiation injury.

20. The method according to claim 19 wherein said active agent is administered at a dose of up to about 20 g. per day for chronic use.

21. The method according to claim 18 wherein said active agent is administered at a close between 1–100 mg per day, multiple applications, and for a plurality of days.

22. A method for prevention of doxorubicin-induced cytotoxicity to mammalian cells without opposition of doxorubicin anti-proliferative effect, comprising contacting said mammalian cells with one or more unit doses of a pharmaceutical composition comprising an active agent consisting essentially of a combination of fructose hexanoate in admixture with an approximately molar equivalent amount of β-cyclodextrin, together with at least one pharmaceutically acceptable excipient and wherein said active agent is present in an amount effective to avoid doxorubicin cytotoxicity in said cells in vitro.

23. A process for the preparation of a pharmaceutical composition as set forth in claim 1 or 8, comprising contacting a fructose ester selected from the group consisting of fructose hexanoate, fructose pentanoate or fructose heptanoate with an aqueous solution of β-cyclodextrin in approximately 1:1 molar ratio, to form a fructose ester β-cyclodextrin complex.

\* \* \* \* \*